(12) United States Patent
Chan et al.

(10) Patent No.: US 7,898,764 B2
(45) Date of Patent: *Mar. 1, 2011

(54) SYSTEM, METHOD, AND APPARATUS FOR SLIT SHROUD WITH INTEGRATED BYPASS CHANNEL WALL FEATURE FOR DISK DRIVE APPLICATIONS

(75) Inventors: Andre S. Chan, Milpitas, CA (US); Chisin Chiang, San Jose, CA (US); James Francis Sullivan, San Jose, CA (US); Ferdinand Hendriks, Morgan Hill, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 554 days.

This patent is subject to a terminal disclaimer.

(21) Appl. No.: 11/550,829

(22) Filed: Oct. 19, 2006

(65) Prior Publication Data

US 2008/0094747 A1    Apr. 24, 2008

(51) Int. Cl.
*G11B 33/14*    (2006.01)

(52) U.S. Cl. .................................. 360/97.02; 360/97.01

(58) Field of Classification Search ................ 360/97.02
See application file for complete search history.

(56) References Cited

U.S. PATENT DOCUMENTS

| 6,560,066 B2* | 5/2003 | Imai et al. ................. 360/97.02 |
| 6,628,475 B2* | 9/2003 | Nakamoto et al. ......... 360/97.02 |
| 2003/0210492 A1* | 11/2003 | Adams et al. .............. 360/97.02 |
| 2004/0252405 A1* | 12/2004 | Sun et al. ................... 360/97.02 |
| 2005/0041332 A1* | 2/2005 | Chan et al. ................. 360/97.02 |
| 2007/0002490 A1* | 1/2007 | Suwa et al. ................ 360/97.02 |
| 2007/0188914 A1* | 8/2007 | Gross ........................ 360/97.02 |

* cited by examiner

*Primary Examiner* — William J Klimowicz
*Assistant Examiner* — Carlos E Garcia

(57) ABSTRACT

A disk drive slit shroud mitigates a discontinuity in the bypass channel with an additional wall feature formed on the slit shroud. When installed, the wall feature fills the gap in the wall of the bypass channel that would otherwise be required to accommodate a slit shroud of sufficient surface area. The discontinuity in the channel wall is needed for manufacturing clearance during the installation of the slit shroud. The slit shroud design includes the wall feature which, when installed, fills up the gap in the channel wall to maintain a relatively flush conduit for the bypass channel.

6 Claims, 3 Drawing Sheets

SYSTEM, METHOD, AND APPARATUS FOR SLIT SHROUD WITH INTEGRATED BYPASS CHANNEL WALL FEATURE FOR DISK DRIVE APPLICATIONS

BACKGROUND OF THE INVENTION

1. Technical Field

The present invention relates in general to disk drives and, in particular, to an improved system, method, and apparatus for a slit shroud with an integrated bypass channel wall feature for disk drive applications.

2. Description of the Related Art

Generally, a data access and storage system consists of one or more storage devices that store data on magnetic or optical storage media. For example, a magnetic storage device is known as a direct access storage device (DASD) or a hard disk drive (HDD) and includes one or more disks and a disk controller to manage local operations concerning the disks. The hard disks themselves are usually made of aluminum alloy or a mixture of glass and ceramic, and are covered with a magnetic coating. Typically, one to six disks are stacked on a common spindle that is turned by a disk drive motor at several thousand revolutions per minute (rpm).

A typical HDD also utilizes an actuator assembly. The actuator moves magnetic read/write heads to the desired location on the rotating disk so as to write information to or read data from that location. Within most HDDs, the magnetic read/write head is mounted on a slider. A slider generally serves to mechanically support the head and any electrical connections between the head and the rest of the disk drive system. The surface of the slider facing the disk is aerodynamically shaped to create an air bearing in order to maintain a uniform distance from the surface of the rotating disk, thereby preventing the head from undesirably contacting the disk.

Typically, a slider is formed with an aerodynamic pattern of protrusions on its air bearing surface (ABS) that enables the slider to fly at a substantially constant height close to the disk during operation of the disk drive. A slider is associated with each side of each disk and flies just over the disk's surface. Each slider is mounted on a suspension to form a head gimbal assembly (HGA). The HGA is then attached to a semi-rigid actuator arm that supports the entire head flying unit. Several semi-rigid arms may be combined to form a single movable unit having either a linear bearing or a rotary pivotal bearing system.

The head and arm assembly is linearly or pivotally moved utilizing a magnet/coil structure that is often called a voice coil motor (VCM). The stator of a VCM is mounted to a base plate or casting on which the spindle is also mounted. The base casting with its spindle, actuator VCM, and internal filtration system is then enclosed with a cover and seal assembly to ensure that no contaminants can enter and adversely affect the reliability of the slider flying over the disk. When current is fed to the motor, the VCM develops a torque that is substantially proportional to the applied current. The arm acceleration is therefore substantially proportional to the magnitude of the current. As the read/write head approaches a desired track, a reverse polarity signal is applied to the actuator, causing the signal to act as a brake, and ideally causing the read/write head to stop and settle directly over the desired track.

In the prior art, a number of solutions have been proposed to enhance the air flow within hard disk drives, such as bypass channels located adjacent to the disk pack. For example, some disk drives have air guides that only guide a central portion of the flow of air back to the disks. Other disk drives have housings with doors that guide the flow of air from the disks to a filter, or they use diverter ramps that also only affect a central portion of the air flow.

For server class disk drive applications, the turbulence generated by the disk drive internal airflow is a significant contributor to the track misregistration (TMR) budget. To improve file performance and reliability, it is important to reduce the turbulence effects for the airflow around the HGA assembly. Two different techniques that are commonly used for turbulence reduction are the "dedicated flow bypass channel" and the "slit shroud."

The dedicated flow bypass channel directs the upstream, highly turbulent airflow away from the HGA assembly region and returns it downstream of the HGA. The bypass channel is designed to have low resistance to airflow so that the extra motor torque needed to bypass the airflow around the HGA region is minimized. For effectiveness and manufacturing cost savings purposes, it is desirable to have the bypass channel designed into the base casting.

The purpose of the slit shroud is to maintain planar disk shrouding and to inhibit axial turbulent velocity components (i.e., relative to the planar orientation of the disks) that excite the HGA assembly. The slit shroud shields each individual suspension and the tail of the integrated lead suspension (ILS) from axial excitation from the mixing of highly turbulent radial flow coming off of the multiple spinning disks during operation. To increase the effectiveness of the slit shroud, the coverage area of the slit shroud adjacent the disks and HGAs must be maximized. Although these solutions are workable for some applications, other applications do not have sufficient coverage area for slit shrouds to operate effectively. Thus, an improved solution for disk drive applications having insufficient area to support conventional slit shrouds would be desirable.

SUMMARY OF THE INVENTION

One embodiment of a system, method, and apparatus for a disk drive slit shroud mitigates a discontinuity in the bypass channel with a wall feature in the slit shroud. When installed, the wall feature fills the gap in the wall of the bypass channel that would otherwise be required to accommodate a slit shroud of sufficient surface area. The bypass channel is most effective when designed into the base casting of the disk drive. In one embodiment, the discontinuity in the channel wall is needed for manufacturing clearance during the installation of the slit shroud. The slit shroud design includes the wall feature which, when installed, fills up the gap in the channel wall to maintain a relatively flush conduit for the bypass channel such that air leakage is minimized.

The invention is highly effective for some disk drive applications due to the limited disk drive "real estate" or surface area available in the disk drive, and for manufacturing process requirements. The bypass channel wall continuity must be compromised in some disk drive applications so that the slit shroud can be installed. The violation of the bypass wall continuity reduces the effectiveness of both the bypass channel because of reduced pressure and the slit shroud due to the addition of airflow disturbance from bypass channel leakage. The invention overcomes the limitations and makes limited area drives compatible with slit shrouds.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the present invention, which will become apparent, are attained and can be understood in more detail, more particular description of the invention briefly summarized above may be had by reference to the embodiments thereof that are illustrated in the appended drawings which form a part of this specification. It is to be noted, however, that the drawings illustrate only some embodiments of the invention and therefore are not to be considered limiting of its scope as the invention may admit to other equally effective embodiments.

DETAILED DESCRIPTION OF THE INVENTION

Figure 1:
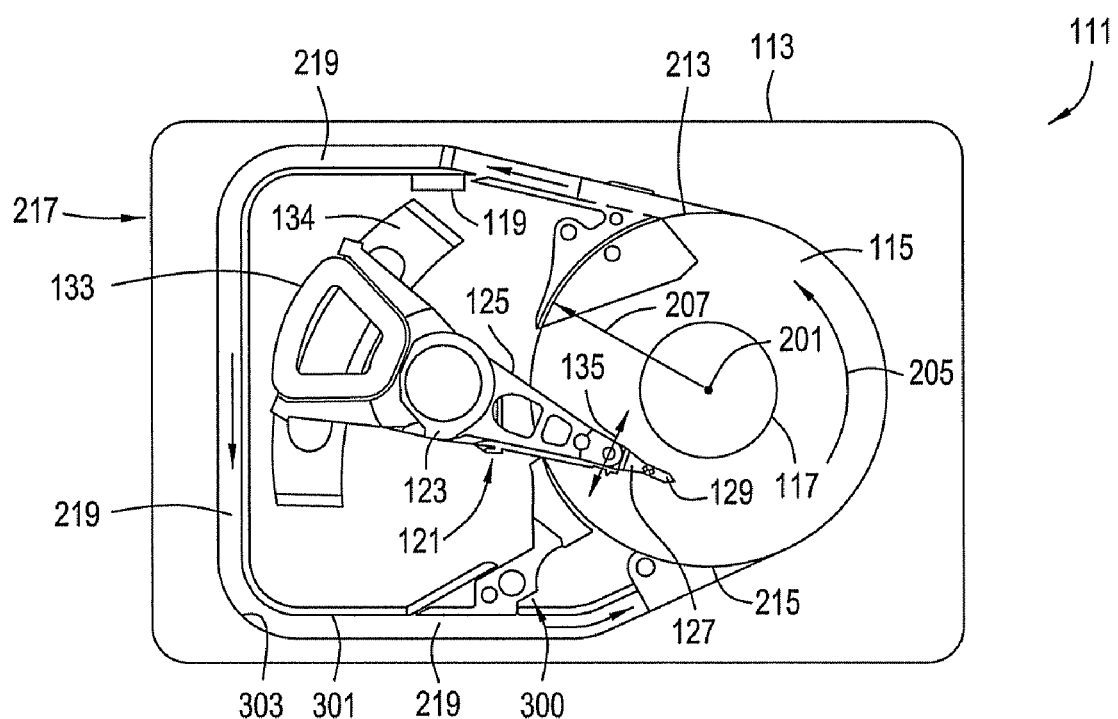
FIG. 1 is a plan view of one embodiment of a disk drive constructed in accordance with the present invention.

Referring to FIG. 1, one embodiment of a system, method, and apparatus for an information storage system comprising a magnetic hard disk file or drive 111 for a computer system having a lightweight spoiler wing design is shown. Drive 111 has an outer housing including a base 113 and top cover (not shown). The housing contains a disk pack having at least one media disk, e.g., magnetic disk 115. The disks 115 are rotated (see arrows 205) by a spindle motor assembly having a central drive hub 117. An actuator 121 comprises a plurality of parallel actuator arms 125 in the form of a comb that is movably or pivotally mounted to base 113 about a pivot assembly 123. A controller 119 is also mounted to base 113 for selectively moving the comb of arms 125 relative to disk 115.

In the embodiment shown, each arm 125 has extending from it at least one cantilevered load beam and suspension 127. A magnetic read/write transducer or head is mounted on a slider 129 and secured to a flexure that is flexibly mounted to each suspension 127. The read/write heads magnetically read data from and/or magnetically write data to disk 115. The level of integration called the head gimbal assembly (HGA) is the head and the slider 129, which are mounted on suspension 127.

Suspensions 127 bias the air bearing surface of the slider 129 against the disk 115 to cause the slider 129 to fly at a precise distance from the disk. A voice coil 133 free to move within a conventional voice coil motor magnet assembly 134 (top pole not shown) is also mounted to arms 125 opposite the head gimbal assemblies. Movement of the actuator 121 (indicated by arrow 135) by controller 119 moves the head gimbal assemblies along radial arcs across tracks on the disk 115 until the heads settle on their respective target tracks. The head gimbal assemblies operate in a conventional manner and always move in unison with one another, unless drive 111 uses multiple independent actuators (not shown) wherein the arms can move independently of one another.

The disks 115 define an axis 201 of rotation 205 and radial direction 207 relative to the axis 201. The disks 115 have a downstream side 213 wherein air flows away from the disks 115, and an upstream side 215 wherein air flows toward the disks 115. The drive 111 also has a bypass channel 219 located in the housing 113 for directing the air flow generated by rotation of the disks 115 from the downstream side 213 of the disk pack or disks 115 to the upstream side 215 of the disks 115. In this way the airflow substantially bypasses the actuator.

In the embodiment shown, the bypass channel 219 is located between an outer perimeter 217 of the housing 113 and the actuator 121, such that the bypass channel 219 completely circumscribes the actuator 121. The elements that define the bypass channel 219 may be integrally formed (e.g., cast) with the base 113. In some HDD designs where there is not sufficient space to implement a full bypass channel (shown) the bypass channel 219 may be interrupted (not shown). This is known as a partial bypass. Furthermore, in order to help the bypass airflow negotiate substantial angular changes (channel bends), one or more turning vanes may be placed in those areas.

Referring now to FIGS. 1-4, one embodiment of the drive 111 also comprises a slit shroud 300. The slit shroud 300 is designed to be integrated and work with the bypass channel 219. The bypass channel 219 includes inner and outer walls 301, 303 that define the conduit for the airflow. At least one opening 305 (FIGS. 2 and 3) is formed in the inner wall 301 adjacent the actuator 121. The slit shroud 300 may be mounted to the housing adjacent the actuator 121 for maintaining planar shrouding of the media disk(s) 115 and inhibit axial turbulent velocity components with respect to the actuator 121. The slit shroud 300 has a wall feature 307 that is located in and closes the opening 305 when fully installed (FIG. 4) at the inner wall 301 of the bypass channel 219. The wall feature 307 is complementary to the inner wall 301 and, in one embodiment, flush with it as well for contiguous airflow through the conduit and to reduce drag.

In one embodiment, the wall feature 307 of the slit shroud 300 and the inner wall 301 of the bypass channel 219 extend in an axial direction (e.g., vertically) from the housing. The wall feature 307 and the opening 305 may span a linear gap of approximately 1 mm to 20 mm. For example, a typical 3.5-inch server class drive the gap may comprise about 5 mm. As shown in the drawings, the opening 305 may comprise a flat rectangular hole, and the wall feature 307 is a flat rectangular panel that completely covers opening 305.

Figure 2:
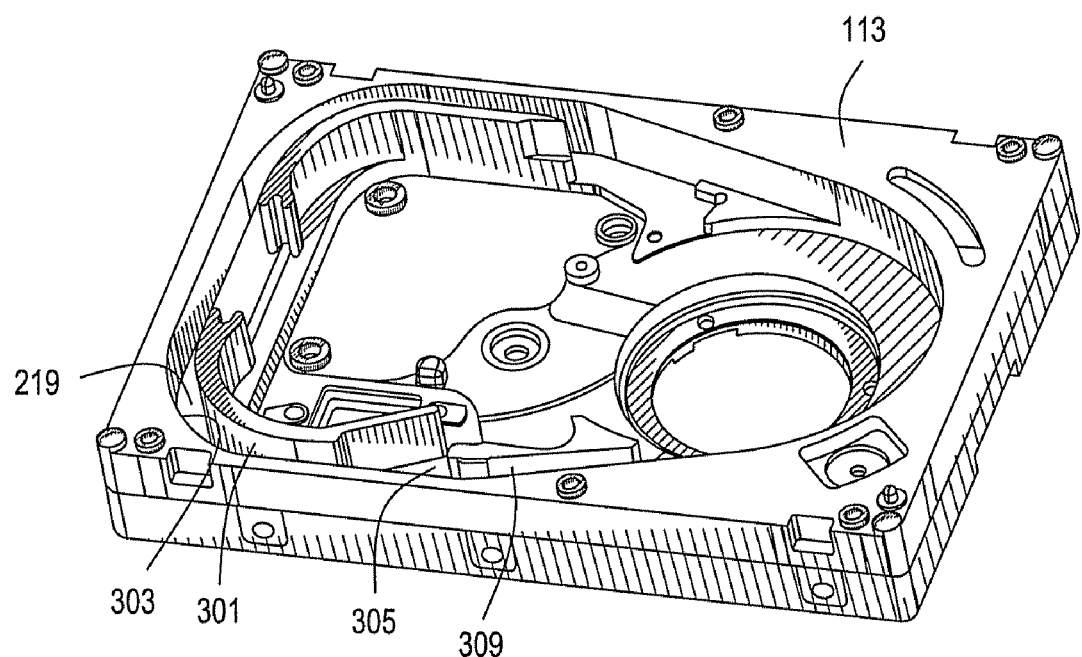
FIG. 2 is an isometric view of a base casting of the disk drive of FIG. 1, shown without installation of a slit shroud, and is constructed in accordance with the present invention.
Figure 3:
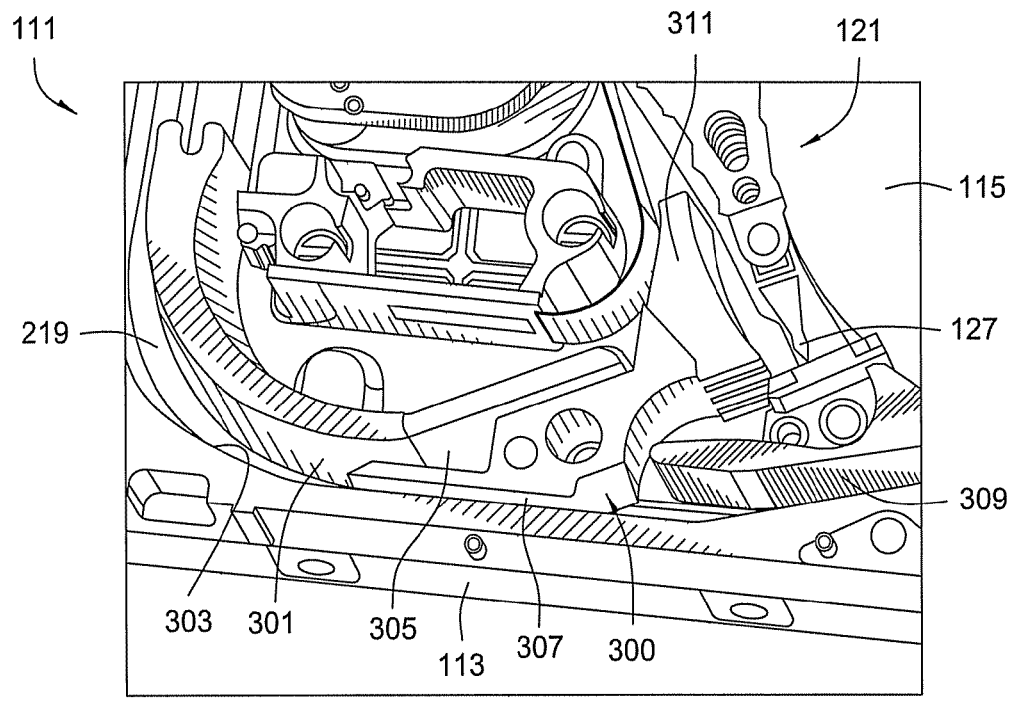
FIG. 3 is an enlarged isometric view of a portion of the base casting of FIG. 2, shown with a slit shroud partially installed, and is constructed in accordance with the present invention.

As shown in the illustrated embodiment of FIG. 2, the opening 305 in the inner wall 301 of the bypass channel 219 is located on the upstream side 215 (reference FIG. 1) of the media disk 115 but spaced apart from the media disk 115. The opening 305 separates the inner wall 301 into an upstream portion 309 to the right of opening 305 in FIG. 2 and a downstream portion to the left of opening 305 in FIG. 2. The downstream portion of the inner wall 301 extends from the downstream side 213 of the media disk 115 and around the actuator 121 opposite the media disk 115. The upstream portion 309 of the inner wall 301 is located only directly adjacent the upstream side 215 of the media disk 115, such that the downstream portion of the inner wall 301 is much longer and represents more of the inner wall 301 than the upstream portion 309 of the inner wall 301.

Figure 4:
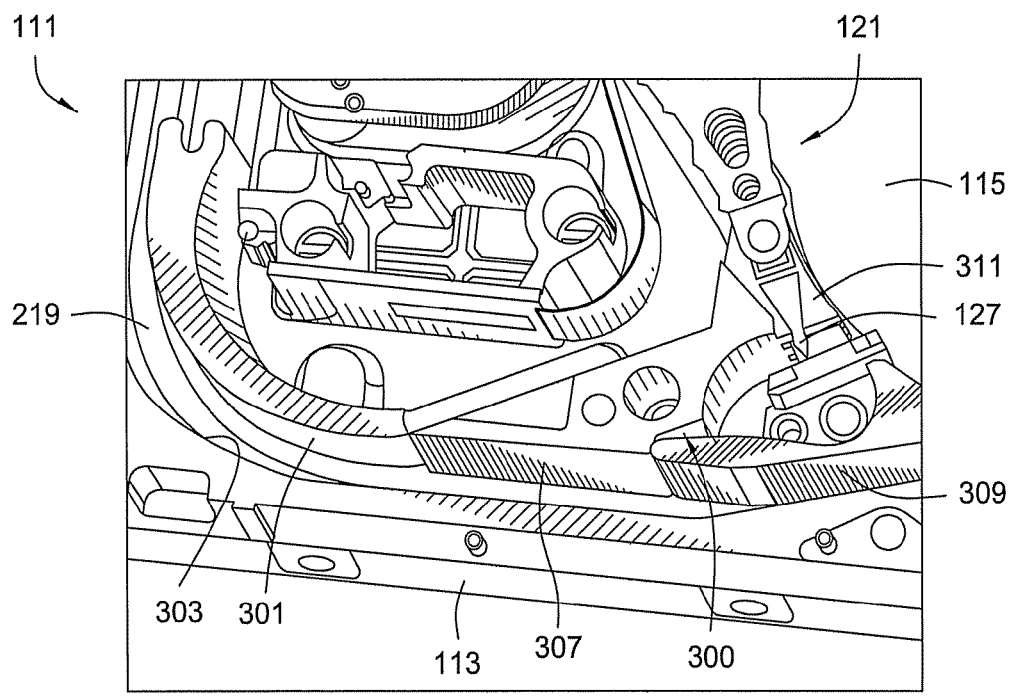
FIG. 4 is an enlarged isometric view of a portion of the base casting of FIG. 3, shown with the slit shroud installed, and is constructed in accordance with the present invention.

In addition, the slit shroud 300 comprises one or more planar platforms 311 that may be equal in number to the number of media disks 115. The platforms 311 are axially aligned with and parallel to the media disks 115. As shown in FIG. 4, the platforms 311 have a planar surface area that extends from the perimeters of the media disks 115 outward toward the wall feature 307 of the slit shroud 300.

In some disk drive embodiments, a load/unload ramp is required for suspensions 127. For those applications, the "sliding" installation of slit shroud 300 relative to suspensions 127 (i.e., parallel to the planes defined by suspensions 127) prevents damage to the components of the drive. If no load/unload ramp is required, the slit shroud 300 (i.e., wall feature 307) may be installed directly downward into opening 305 by motion perpendicular to the planes defined by suspensions 127.

Figure 5:
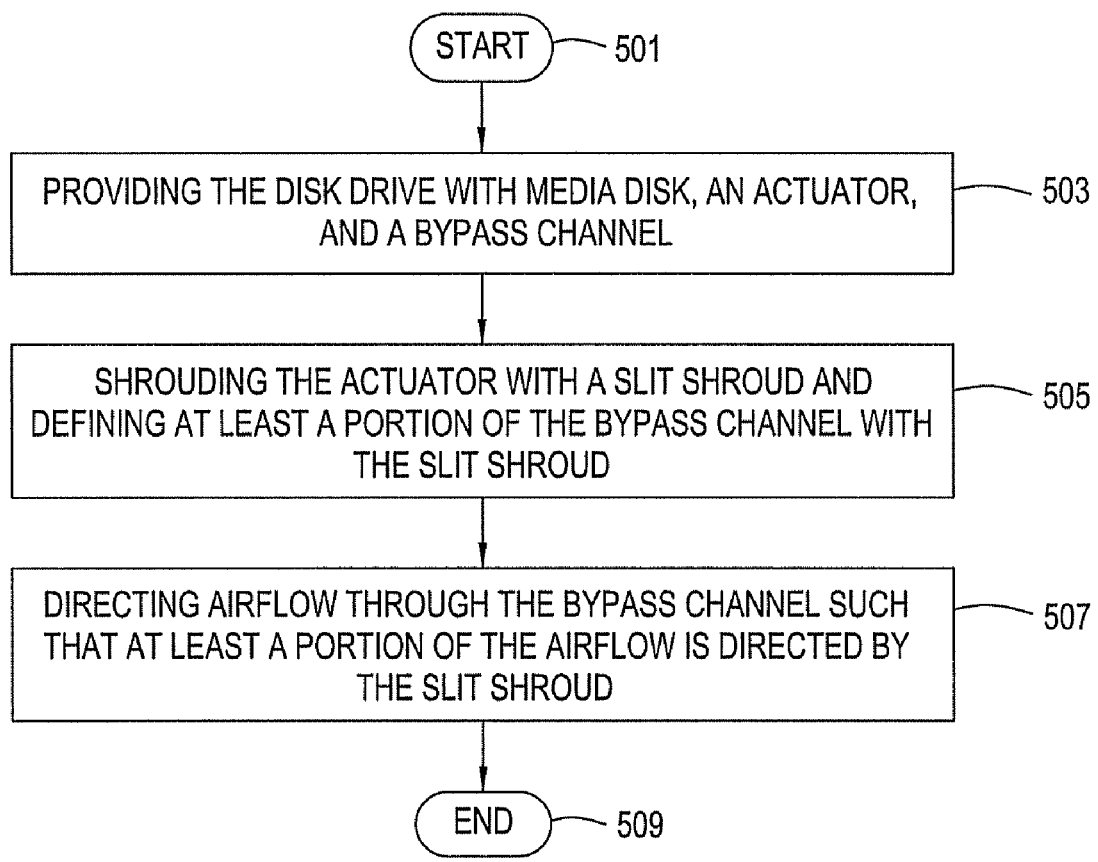
FIG. 5 is a high level flow diagram of a method in accordance with the present invention.

Referring now to FIG. 5, the invention also comprises a method of directing airflow in a disk drive. In one embodiment the method begins as indicated at step 501, and comprises providing the disk drive with a media disk, an actuator, and a bypass channel (step 503); shrouding the actuator with a slit shroud and defining at least a portion of the bypass channel with the slit shroud (step 505); directing airflow through the bypass channel such that at least a portion of the airflow is directed by the slit shroud (step 507); before ending as indicated at step 509.

The method may further comprise directing airflow with the bypass channel from a downstream side of the media disk to an upstream side of the media disk, and providing the slit shroud with a wall feature that defines said at least a portion of the bypass channel. In another embodiment, the method may comprise substantially bypassing airflow around the actuator with the bypass channel, and providing the bypass channel with a wall that defines a conduit for the airflow and an opening in the wall adjacent the actuator, and wherein the slit shroud maintains planar shrouding of the media disk and inhibits axial turbulent velocity components with respect to the actuator, and the slit shroud has a wall feature that closes the opening in the wall of the bypass channel, such that the wall feature is complementary to the wall. In addition the method may further comprise making the slit shroud flush with the bypass channel.

While the invention has been shown or described in only some of its forms, it should be apparent to those skilled in the art that it is not so limited, but is susceptible to various changes without departing from the scope of the invention.

What is claimed is:

1. A disk drive, comprising:
    a housing having a base, a top cover, a hub that defines an axis of rotation, and a radial direction relative to the axis;
    a media disk mounted to the hub for rotation relative to the housing, the media disk having a downstream side and an upstream side;
    an actuator mounted to the housing and movable relative to the media disk, the actuator having a head for reading data from the media disk;
    a bypass channel integrally formed with the base for directing airflow from the downstream side of the media disk to the upstream side of the media disk, such that the airflow substantially bypasses the actuator, the bypass channel having inner and outer walls that define a conduit for the airflow and an opening in the inner wall adjacent the actuator; and
    a slit shroud mounted to the housing and extending toward the actuator for maintaining planar shrouding of the media disk and to inhibit axial turbulent velocity components, the slit shroud having a wall feature located in and closing the opening in the inner wall of the bypass channel, such that the wall feature is complementary to and flush with the inner wall such that the slit shroud only forms a portion of the inner wall of the bypass channel and the airflow is contiguous through the conduit and air leakage from the conduit through the opening is minimized by the wall feature of the slit shroud; and
    the opening in the inner wall of the bypass channel is located on the upstream side of the media disk, such that the opening separates the inner wall into an upstream portion of the inner wall and a downstream portion of the inner wall, with the downstream portion of the inner wall extending from the downstream side of the media disk and around the actuator opposite the media disk, the upstream portion of the inner wall is located only directly adjacent the upstream side of the media disk such that the upstream portion of the inner wall causes the opening to be spaced apart from the media disk, and the downstream portion of the inner wall is longer than the upstream portion of the inner wall.

2. A disk drive according to claim 1, wherein the wall feature of the slit shroud and the inner wall of the bypass channel extend in an axial direction from the housing, and the slit shroud is a load/unload ramp for the actuator.

3. A disk drive according to claim 1, wherein the media disk comprises a plurality of media disks, and the slit shroud has a plurality of planar platforms that are equal in number to the media disks, the planar platforms being axially aligned with and parallel to the media disks.

4. A disk drive according to claim 1, wherein the wall feature and the opening span a linear gap of approximately 1 mm to 20 mm.

5. A disk drive according to claim 1, wherein the opening is a flat rectangular hole, and the wall feature a flat rectangular panel.

6. A method of directing airflow in a disk drive, comprising:
    (a) providing the disk drive with a media disk, an actuator, and a bypass channel having inner and outer walls that define a continuous conduit for airflow;
    (b) shrouding the actuator with a slit shroud and defining at least a portion of the bypass channel with the slit shroud such that a wall feature of the slit shroud is located in an opening in the inner wall and the slit shroud only forms a portion of the inner wall of the bypass channel;
    (c) directing airflow through the conduit of the bypass channel such that said at least a portion of the airflow is directed by the slit shroud, and directing airflow with the bypass channel from a downstream side of the media disk to an upstream side of the media disk;
    (d) providing the slit shroud with a wall feature that defines said at least a portion of the bypass channel, and dividing the inner wall with the opening into an upstream portion of the inner wall and a downstream portion of the inner wall, with the downstream portion of the inner wall extending from the downstream side of the media disk and around the actuator opposite the media disk, the upstream portion of the inner wall is located only directly adjacent the upstream side of the media disk such that the upstream portion of the inner wall causes the opening to be spaced apart from the media disk, and the downstream portion of the inner wall is longer than the upstream portion of the inner wall; and
    (e) substantially bypassing airflow around the actuator with the bypass channel, the slit shroud maintains planar shrouding of the media disk and inhibits axial turbulent velocity components with respect to the actuator, and the wall feature closes the opening in the wall of the bypass channel, such that the wall feature is flush with, contiguous with, and complementary to the inner wall.

* * * * *